US006819852B2

(12) United States Patent
Allan et al.

(10) Patent No.: US 6,819,852 B2
(45) Date of Patent: Nov. 16, 2004

(54) OPTIMIZED DEFECTS IN BAND-GAP WAVEGUIDES

(75) Inventors: Douglas C. Allan, Corning, NY (US); Nicholas F. Borrelli, Elmira, NY (US); James C. Fajardo, Painted Post, NY (US); Karl W. Koch, III, Elmira, NY (US); James A. West, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/713,241

(22) Filed: Nov. 13, 2003

(65) Prior Publication Data

US 2004/0105645 A1 Jun. 3, 2004

Related U.S. Application Data

(63) Continuation of application No. 10/067,644, filed on Feb. 4, 2002, now Pat. No. 6,778,749.
(60) Provisional application No. 60/277,312, filed on Mar. 20, 2001.

(51) Int. Cl.$^7$ ................................................. G02B 6/10
(52) U.S. Cl. ....................................... 385/129; 385/123
(58) Field of Search .................. 385/14, 129, 123–125, 385/131, 132; 359/321, 322

(56) References Cited

U.S. PATENT DOCUMENTS 6,640,037 B2 * 10/2003 Gallagher .................... 385/125
6,674,949 B2 * 1/2004 Allan et al. .................. 385/129

FOREIGN PATENT DOCUMENTS

| DE | 1 118 887 | 7/2001 |
|---|---|---|
| WO | WO 9964903 A | 12/1999 |
| WO | WO 0006506 A | 2/2000 |

OTHER PUBLICATIONS

U.S. patent application Ser. No. 09/563,390, Cook et al., filed Apr. 28, 2000.

Broeng et al., Analysis of Air–Guiding Photonic Bandgap Fibers, Optics Letters, vol. 25, No. 2, Jan. 15, 2000.

Cregan et al., Single–Mode Photonic Band Gap Guidance of Light in Air, Science Magazine, vol. 285, pp. 1537–1539, 1999.

Meade et al., Electromagnetic Bloch Waves at the Surface of a Photonic Crystal, Physical Review B, vol. 44, No. 19, Nov. 15, 1991.

Johnson et al., Block–Iterative Frequencey–Domain Methods for Maxwell's Equations in a Planewave Basis, Optics Express, vol. 8, No. 3, pp. 173–190, Jan. 29, 2001.

Joannopoulos et al., Photonic Crystals: Molding the Flow of Light, Princeton University Press, 1995 (entire book)**.

Steven G. Johnson and J.D. Joannopoulos, The Mit Photonic–Bands Package, http://ab–initio.mit.edu/mpb/.**

(List continued on next page.)

*Primary Examiner*—Phan T. H. Palmer
(74) *Attorney, Agent, or Firm*—Svettana Z. Short

(57) ABSTRACT

Disclosed is a photonic band-gap crystal waveguide having the physical dimension of the photonic crystal lattice and the size of the defect selected to provide for optimum mode power confinement to the defect. The defect has a boundary which has a characteristic numerical value associated with it. The ratio of this numerical value to the pitch of the photonic crystal is selected to avoid surface modes found to exist in certain configurations of the photonic band-gap crystal waveguide. Embodiments in accord with the invention having circular and hexagonal defect cross sections are disclosed and described. A method of making the photonic band-gap crystal waveguide is also disclosed and described.

17 Claims, 6 Drawing Sheets

OTHER PUBLICATIONS

Ferrando et al., "Donor and Acceptor Guide Modes in Photonic Crystal Fibers", Optics Letters, Optical Society of America, vol. 25, No. 18, Sep. 15, 2000, pp. 1328–1330.

Barkou et al., "Silica–Air Photonic Crystal Fiber Design that Permits Waveguiding by a True Photonic Bandgap Effect", Optics Letters, Optical Society of America, vol. 24, No. 1, Jan. 1, 1999, pp. 46–48.

Russell et al., "Silica/Air Photonic Crystal Fibres", Japanese Journal of Applied Physics, vol. 37, No. Suppl. 37–1, 1998, pp. 45–48.

Gerard et al., "Photonic Bandgap of Two–Dimensional Dielectric Crystals", Solid State Electronics, vol. 37, No. 4–6, 1994, pp. 1341–1344.

* cited by examiner

OPTIMIZED DEFECTS IN BAND-GAP WAVEGUIDES

This is a continuation of U.S. patent application Ser. No. 10/067,644 filed on Feb. 4, 2002 now U.S. Pat. No. 6,778,749, the content of which is relied upon and incorporated herein by reference in its entirety, and the benefit of priority under 35 U.S.C. § 120 is hereby claimed as well as the benefit and priority to U.S. Provisional Patent Application No. 60/277,312, filed Mar. 20, 2001.

BACKGROUND OF THE INVENTION

1. Field of the Invention

The present invention relates generally to photonic band-gap crystal waveguides, and particularly to photonic band-gap crystal waveguides having a low refractive index core region. The invention is also directed to a method of making low refractive index core photonic band-gap crystal waveguides.

2. Technical Background

Knowledge of how to guide light in a material by means of total internal reflection is old in physical science. One of the drawbacks of light guides using total internal reflection lies in the very principle of total internal reflection. That is, total internal reflection occurs at the interface between a first and a second material having different refractive indexes. Light traveling in the material of higher refractive index is reflected (totally reflected for incident angles lower than the critical angle) at the interface with the material of lower refractive index. Thus, the total internal reflection mechanism acts to confine the light to the higher index material. The higher index material typically is higher in density and so is characterized by higher attenuation due to Rayleigh scattering and by a higher non-linear coefficient. The non-linear effects can be mitigated by designing total internal reflection waveguides that have relatively high effective area. However, the complexity of the core refractive index profile usually increases for designs that provide larger effective area. This complexity usually translates to higher cost.

More recently, diffraction has been studied as a means to guide light in a material. In a light guiding protocol in which the confinement mechanism is diffraction, the material in which the light is guided, i.e., the core of the optical waveguide, can have a relatively low refractive index and thus a lower density. In fact, the use of a gas or a vacuum as a waveguide core becomes practical.

A particular structure well suited for use as a diffraction type optical waveguide is a photonic band-gap crystal. The photonic crystal itself is a regular lattice of features in which the spacing of the features is of the order of the light wavelength to be guided. The photonic crystal can be constructed of a first material having a first refractive index. Embedded in this first material, in the form of a regular lattice or array, is a second material having a second refractive index. This is the basic photonic crystal structure. Variations on this basic design can include more than two materials in the make up of the photonic band-gap crystal. The number of useful variations in the details of the lattice structure is also large. In the basic photonic crystal structure, the second material can simply be pores or voids formed in the first material. Depending upon the refractive index difference of the materials and the spatial arrangement and pitch (center to center distance between features) of the embedded features, the photonic crystal will not propagate light having a wavelength within a certain wavelength band. This is the "band-gap" of the photonic crystal and is the property of the photonic crystal that provides for light confinement. It is due to this property that the structure is given the name, photonic band-gap crystal.

To form an optical waveguide (or more generally, a structure that guides electro-magnetic energy), a defect is formed in the photonic band-gap crystal. The defect is a discontinuity in the lattice structure and can be a change in pitch of the lattice, the replacement of a portion of the lattice by a material of different refractive index, or the removal of a portion of the photonic band-gap crystal material. The shape and size of the defect is selected to produce or support a mode of light propagation having a wavelength that is within the band-gap of the photonic crystal. The walls of the defect are thus made of a material, a photonic band-gap crystal, which will not propagate the mode produced by the defect. In analogy with the total internal reflection optical waveguide, the defect acts as the waveguide core and the photonic band-gap crystal acts as the clad. However, the mechanism of the waveguide allows the core to have a very low refractive index thus realizing the benefits of low attenuation and small non-linear coefficient.

Because of the potential benefits provided by a photonic band-gap crystal waveguide, there is a need to identify defect structures that produce modes that have useful wavelengths, the modes being efficiently propagated over practical distances. More particularly, there is a need to investigate whether photonic band-gap crystal defect structures exist that will allow photonic band-gap crystal waveguides to propagate light signals over distances compatible with telecommunication systems.

Other uses of the photonic band-gap crystal waveguide include those that involve the delivery of high electromagnetic power levels such as in devices for excising material or welding material.

SUMMARY OF THE INVENTION

One aspect of the present invention is a photonic band-gap crystal optical waveguide which includes a photonic crystal having a band-gap. Typically, the photonic band-gap crystal is characterized by a pitch, the center to center distance between repeating features that make up the photonic crystal lattice. The photonic band-gap crystal has a defect, that is, a break or discontinuity in the regularity of the lattice. The defect is characterized by a boundary enclosing a plane cross section of the defect. The enclosing boundary is the locus of points in a plane where the photonic band-gap crystal structure abuts the defect. Perpendicular to the plane cross section is a characteristic length dimension of the defect. In the case disclosed and described herein of a photonic band-gap crystal waveguide structure, the defect length dimension extends through the photonic band-gap crystal so that one has access to either end of the defect.

The boundary of the defect is characterized by a numerical value, which can have units of length. The numerical value can be, for example, a radius, if the defect cross section is circular, the distance of a boundary point from a feature in the cross section (such as the geometrical center), or the perimeter measure of the boundary. The numerical value characteristic of the defect boundary is such that localized modes produced by (supported in) the defect propagate in the wavelength range in the band-gap of the photonic band-gap crystal. Further, the ratio of the numerical value to the photonic band-gap crystal pitch is selected so that the excitation of surface modes within the photonic band-gap is avoided.

When the defect boundary, together with the photonic band-gap crystal pitch are such that surface modes are excited or supported (exist), a large fraction of light power propagated along the defect is essentially not located in the defect. The surface mode propagates at least partially in the photonic band-gap crystal itself. Thus, the distribution of light power is not effective to realize the benefits associated with the low refractive index core of a photonic band-gap crystal optical waveguide.

In an embodiment of this first aspect of the invention, the defect has a circular cross section and the numerical value is the radius of the circle. The ratio of radius to pitch has a range from 0.75 to 1.15.

In a further embodiment of the first aspect of the invention, the ratio of radius to pitch is 1.3 to 1.5. In yet another embodiment in accord with a circular defect cross section, the ratio of radius to pitch is 1.7 to 2.1. At ratios between the ranges given in these circular cross section embodiments, surface modes appear, drawing light power out of the defect.

This first aspect of the invention and the embodiments thereof can advantageously be characterized by a defect which is either partially or entirely a void in the photonic band-gap crystal. As an alternative, this first aspect if the invention and the embodiments thereof can be characterized by a defect which is either partially or entirely a material which has a refractive index lower than at least one of the materials that form the photonic band-gap crystal lattice. As is known in the art, the photonic band-gap crystal lattice is generally formed from at least two materials which differ from one another in refractive index.

In a single mode waveguide embodiment in accord with the first aspect of the invention, the photonic band-gap crystal includes air. For example, the crystal lattice can be symmetrically spaced voids or pores formed in a material such as $SiO_2$. The materials used to form photonic band-gap crystals are known in the art and are described for example in *Photonic Crystals: Molding the Flow of Light*, J. D. Joannopoulos, et al., Princeton University Press, Princeton, 1995. The fractional volume of air making up the photonic band-gap crystal can be specified as having a particular value or range of values. The term fractional volume of air is the ratio of the volume of the crystal that is air to the total volume of the crystal. The fractional volume of the pores that may make up the photonic crystal is also a useful measure. In this case, the pores may be filled with air, be evacuated, or filled with a material having a pre-selected refractive index.

In an embodiment in accord with the invention, the fractional volume of air is not less than 0.67, the defect has a circular cross section and the numerical value characteristic of the defect boundary is the cross section radius. To achieve a light mode propagating with not less than 0.5 of the mode power in the defect (the mode power fraction), the ratio of radius to pitch is in the range from about 0.61 to 1.22. To achieve a mode power fraction in the defect of not less than 0.7, the ratio of radius to pitch has a range from about 0.63 to 1.19. To achieve a mode power fraction not less than 0.8, the ratio of radius to pitch has a range from about 0.8 to 1.16.

A mode power fraction not less than 0.9 can be achieved in a photonic band-gap crystal having a defect of circular cross section and a fractional volume of air not less than 0.83, with a ratio of radius to pitch having a range from 1.07 to 1.08. This particular embodiment of the waveguide in accord with the invention is single mode.

In a further embodiment in accord with this aspect of the invention, the defect cross section is a void of hexagonal cross section, the photonic band-gap crystal includes pores having volume fraction not less than 0.67. The numerical value associated with the defect is the length of a line drawn from the center of the hexagon perpendicular to a side of the hexagon. For a mode power fraction within the defect not less than 0.6, the ratio of the numerical value to pitch has a range from 0.9 to 1.35. For mode power within the defect (mode power confinement fraction) not less than 0.8, the ratio of numerical value to pitch has a range from 1.45 to 1.65.

A second aspect of the invention is a method of making a photonic band-gap crystal optical waveguide. The method in accord with the invention includes the steps of a) fabricating a photonic band-gap crystal having a pitch; and, b) forming a defect in the photonic band-gap crystal. The defect has a boundary enclosing the defect cross section and a length perpendicular to the defect cross section. The defect can be located within, or partially within, the photonic band-gap crystal. The boundary is characterized by a numerical value, which is selected such that the wavelength of the localized mode produced by (supported in) the defect propagates in the wavelength range of the photonic crystal band-gap. The ratio of the numerical value characteristic of the defect boundary to the photonic band-gap crystal pitch is selected to avoid the excitation of surface modes within the photonic band-gap.

In an embodiment in accord with the method, the defect is formed by removing material from the photonic band-gap crystal. That is, the defect is a void in the photonic band-gap crystal.

In another embodiment of the method the photonic band-gap crystal is made by forming pores or voids in a material. In a further limitation of this embodiment, the voids or pores make up not less than 0.67, and preferably not less than 0.83, of the volume of the photonic band-gap crystal.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 1:
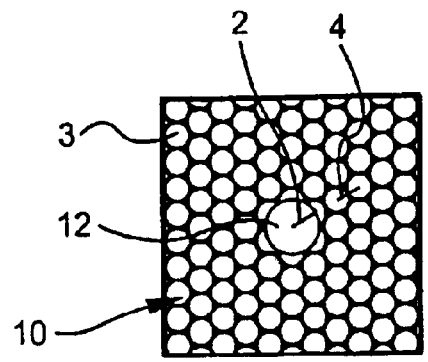
FIG. 1 is an illustration of a photonic band-gap crystal having a defect of circular cross section.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the photonic band-gap crystal waveguide of the present invention is shown in FIG. 1, which is an end view of the waveguide structure. The photonic band-gap crystal 10 is illustrated as a lattice of light colored cylinders 3 embedded in a material represented by the dark areas surrounding each of the cylinders. Although the repeating features, cylinders 3, are shown as having a circular cross section, the cross section can in practice have a general shape, including polygonal, elliptical, or erose. The pitch of the photonic band-gap crystal 10 is shown as line 4 drawn between the centers of nearest neighbor features, in this case cylinders. The photonic band-gap crystal defect 12 is illustrated as having a circular cross section of radius 2. As in the case of the photonic band-gap crystal features, the defect cross section can have a general shape and provide desired performance in accord with the photonic band-gap crystal waveguide of the invention. The length of defect 12 extends into the photonic band-gap crystal in a direction perpendicular to the circular cross section. The boundary between the defect and the photonic band-gap crystal is a circle in this case and the numerical value associated with the boundary is radius 2. The ratio of radius 2 to pitch 4 is selected to be in a range to avoid excitation of surface modes within the photonic band-gap.

The discovery that surface modes can exist at the boundary between a photonic band-gap crystal and a defect therein is a key to the design and fabrication of photonic band-gap crystal waveguides that are efficient and practical in a telecommunications environment as well as in environments that include the delivery of high power electro-magnetic waves.

To calculate the modes supported and the mode power distribution in the photonic band-gap crystal waveguide, Maxwell's vector wave equation having a position dependent dielectric function must be solved. A useful form of this wave equation is found at page 11, equation (7) of the Joannopoulos et al. reference cited above. Techniques for solving the governing equations are known in the art and appear for example in the publications: Steven G. Johnson and J. D. Joannopoulos, *"Block-iterative frequency-domain methods for Maxwell's equations in a planewave basis,"* Optics Express 8, no. 3, 173–190 (2001). In this publication, the authors summarize their work as: "Fully-vectorial eigenmodes of Maxwell's equations with periodic boundary conditions were computed by preconditioned conjugate-gradient minimization of the block Rayleigh quotient in a planewave basis, using a freely available software package." The freely available software package to which they refer is set forth in, Steven G. Johnson and J. D. Joannopoulos, *The MIT Photonic-Bands Package*, and is available on the internet at Universal Resource Identifier http://ab-initio.mit.edu/mpb/.

Figure 4:
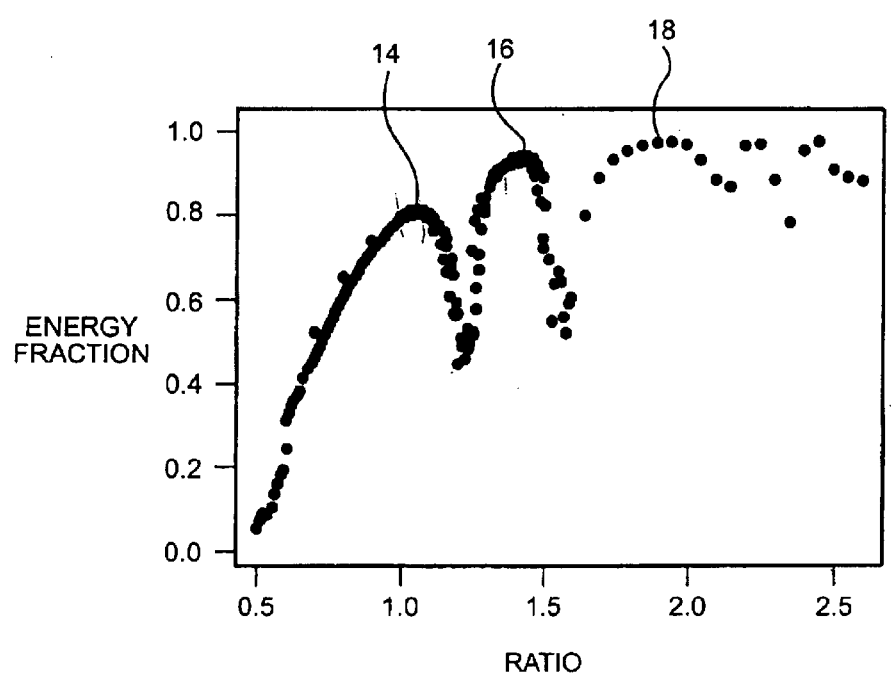
FIG. 4 is a chart of energy fraction of the propagated light mode within the defect versus numerical value to pitch ratio for a defect having a circular cross section.

The results of the calculation as applied to a photonic band-gap crystal waveguide illustrated in FIG. 1 is shown as curve segment 14 in FIG. 4. The vertical axis of FIG. 4 is the fraction of the mode energy contained in the defect of the photonic band-gap crystal waveguide. The horizontal axis is the ratio of defect radius (numerical value of the boundary) to pitch. Curve segment 14 shows that mode energy fraction in the defect is a maximum at a ratio of about 1. The local minimum of curve 14 located near a ratio of 1.3 corresponds to a defect geometry that supports, i.e., propagates a surface mode. In alternative language, the defect geometry allows excitation of surface modes within the photonic band-gap.

Figure 2:
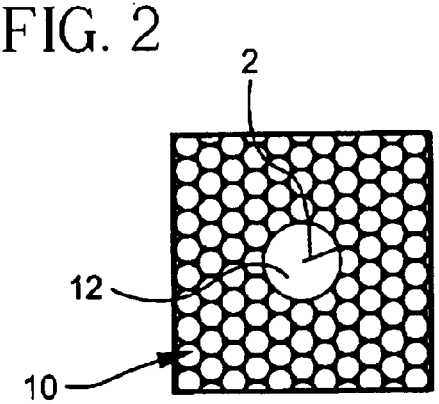
FIG. 2 is an illustration of a photonic band-gap crystal having a defect of circular cross section.

FIG. 2 is an embodiment of the invention essentially identical to that of FIG. 1 except that defect 12 is characterized by a ratio of about 1.5. The propagation characteristics of the photonic band-gap crystal waveguide of FIG. 2 is shown in curve segment 16 of FIG. 4. In the FIG. 2 embodiment, the fraction of mode energy confined to the defect represented in curve segment 16 is maximum at a radius to pitch ratio near 1.5. The local minimum of curve segment 16 that occurs near 1.6 is a photonic band-gap crystal waveguide configuration that supports or allows excitation of one or more surface modes.

Figure 3:
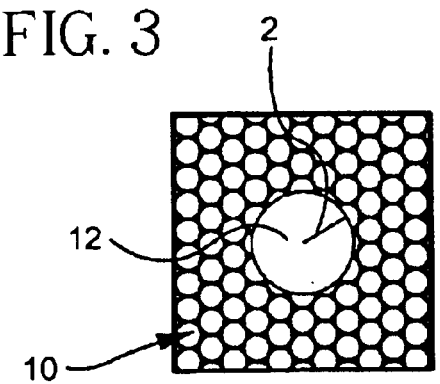
FIG. 3 is an illustration of a photonic band-gap crystal having a defect of circular cross section.

As the ratio continues to increase, i.e., the defect increases in size and the boundary moves out farther into the photonic band-gap crystal, the fraction of mode energy confined to the defect continues to pass through local minima and maxima. FIG. 3 is an embodiment of the invention in which the defect radius to pitch ratio is about 2, which is the location of the maximum of curve segment 18 in FIG. 4. Curve segment 18 corresponds to the photonic band-gap crystal waveguide illustrated in FIG. 3.

For a desired fraction of confined mode energy, the range of allowed ratios can be read from the appropriate curve segment, 14, 16, or 18 in FIG. 4. For the smallest ratio embodiment of a photonic band-gap crystal waveguide in accord with the invention, illustrated in FIG. 1, the waveguide is single mode and the optimum ratio provides for a fraction of mode energy confined to the defect near 0.8. The fraction of confinement is higher as defect radius 2 increases and additional modes are propagated in the defect.

Figure 5:
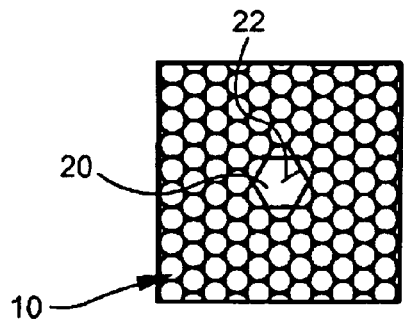
FIG. 5 is an illustration of a photonic band-gap crystal having a defect of hexagonal cross section.
Figure 6:
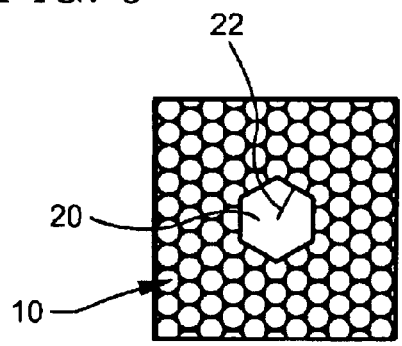
FIG. 6 is an illustration of a photonic band-gap crystal having a defect of hexagonal cross section.
Figure 7:
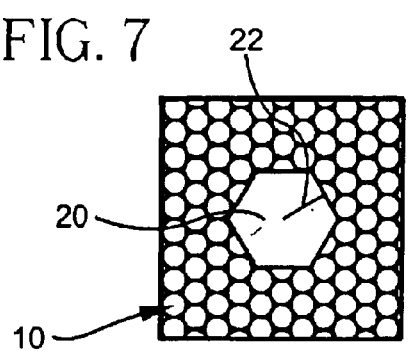
FIG. 7 is an illustration of a photonic band-gap crystal having a defect of hexagonal cross section.
Figure 8:
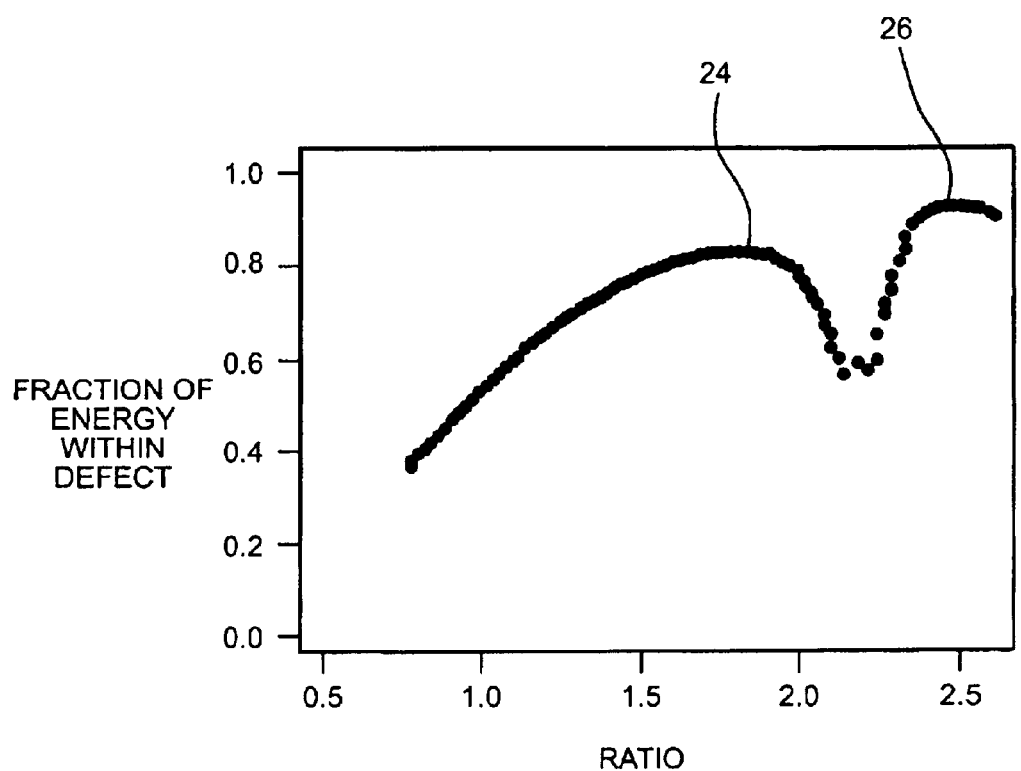
FIG. 8 is a chart of energy fraction of the propagated light mode within the defect versus numerical value to pitch ratio for a defect having a hexagonal cross section.

Additional embodiments of the photonic band-gap crystal waveguide in accord with the invention, and having a defect 20 of hexagonal cross section are shown in FIGS. 5-7. The photonic band-gap crystal 10 in each of these embodiments is essentially identical to that of FIGS. 1-3. The ratio of numerical value 22 to pitch is about 1 in FIG. 5, where the numerical value 22 is defined as the perpendicular distance from the center of the hexagonal defect cross section to one of the sides of the hexagon. In the case of FIGS. 6 and 7, the value of the respective ratios of numerical value 22 to pitch is 1.5 and 2.0. The chart of FIG. 8 shows the fraction of mode energy confined to the defect. Curve segment 24 has a maximum of confinement near 0.8 at a ratio near 1.2.

Another maximum having a confinement fraction near 0.9 is shown by curve segment 26 and is seen to occur at a ratio of about 1.5.

Similar calculations can be carried out for essentially any configuration of photonic band-gap crystal having a defect of essentially any cross section.

The photonic band-gap crystal waveguide can be made using any of a number of methods known in the art. The methods allow the skilled practitioner to make a wide range of shapes of the photonic band-gap crystal features as well as the defect cross section.

One exemplary method of making a photonic band-gap crystal includes the step of arranging a plurality of hollow rods into a bundle. The rods are characterized by an inside and an outside radius and the pitch of the photonic band-gap crystal is the distance between centers of nearest neighbor rods in the bundle. The rods can advantageously be made of a silica base glass. The rods may be held in position by placing them within a tube, by banding, or by heat treatment. For example the bundle could be held in a fixture while the component rods are heated sufficiently to cause them to adhere one to another. A glass frit could also be used to weld the rods into the desired positions. The pitch of the photonic band-gap crystal formed in this manner can be reduced to a desired value by heating and drawing the rod bundle in much the same way a glass preform is heated and drawn to form a waveguide fiber. It is understood that the glass rods can be fabricated to have a wide range of interior cross sections in combination with a wide range of outside cross section shapes. An example is a rod having a hexagonal outside cross section and a circular interior cross section shape. The photonic band-gap crystal waveguides shown in FIGS. 1-3 and 5-7 can be fabricated using rods having a circular interior cross section and a circular outside cross section.

The defect in the photonic band-gap crystal waveguide can be formed by using a fixture, having a desired cross section, about which the rods are assembled. A fixture having essentially any cross section can be used in forming the defect. As an alternative method of forming the defect, rods can simply be left out of the assembly. As a further alternative method of forming the defect, the photonic band-gap crystal can be etched or machined after bundling is completed.

An alternative method of forming the photonic band-gap crystal is by extrusion. In this case, by using the proper dies, the photonic crystal structure and the defect are formed without need for a welding step, a holding tube or fixture, or a fixture to form the defect. The extruded photonic band-gap crystal waveguide can be treated as a waveguide fiber preform and drawn to achieve a desired pitch together with a desired defect numerical value.

Figure 9:
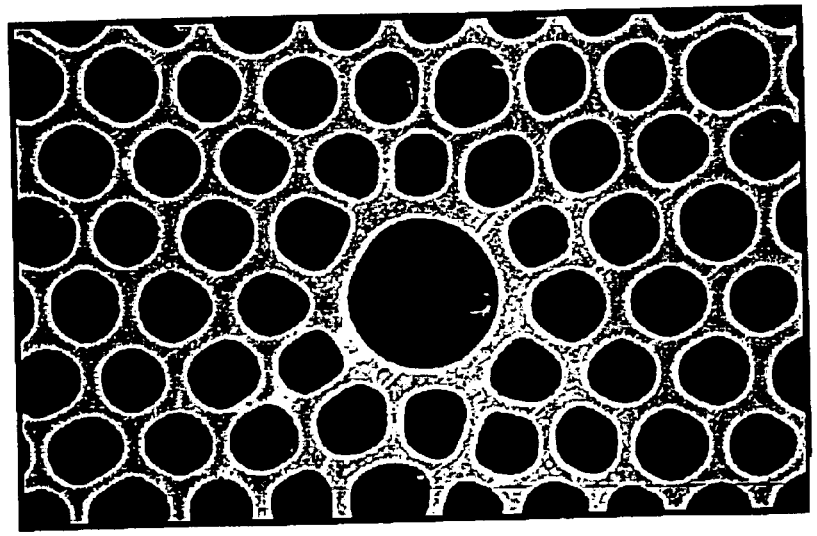
FIG. 9 is a scanning electron microscope photograph of a photonic band-gap crystal having a circular defect.
Figure 10:
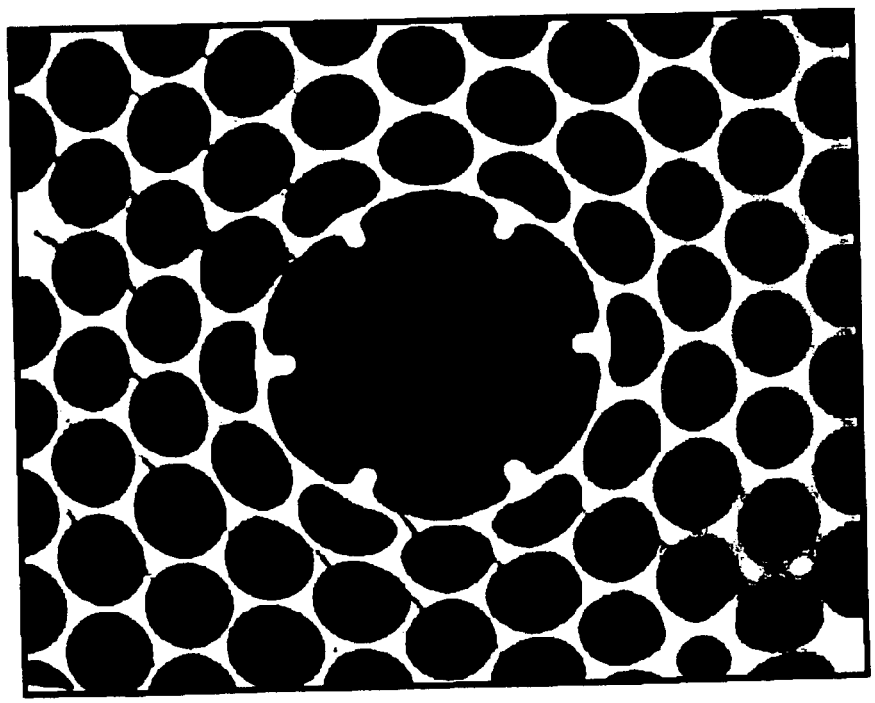
FIG. 10 is a scanning electron microscope photograph of a photonic band-gap crystal having a circular defect.

In FIGS. 9 and 10 are shown scanning electron micrographs of photonic band-gap crystal waveguides made using an assembly of hollow rods arranged about a central tube and enclosed by an outer tube. The rods have respective circular outside and interior cross sections. More specifically. FIG. 10 depicts a micro-graph of a photonic band-gap crystal fiber that includes a defect with a plurality of protrusions. In this exemplary embodiment the protrusions are facing or are directed towards the center of the fiber core.

Figure 11:
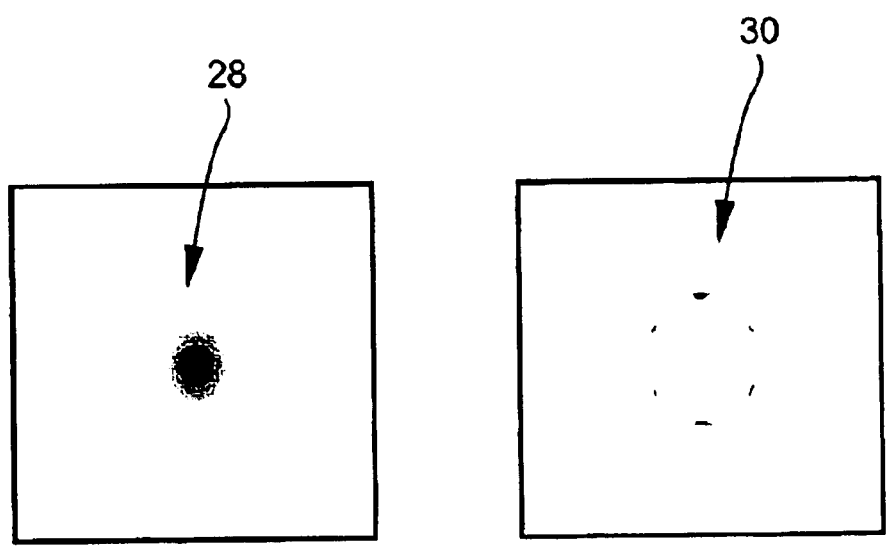
FIG. 11 is an illustration of the mode power distribution in a photonic band-gap crystal having a defect for the case of a mode having a large energy fraction within the defect and for the case of a surface mode.

An illustration of mode energy distributions calculated for photonic band-gap crystal waveguides is given in FIG. 11. Mode energy distribution 28 is a distribution in accord with the invention. The dark central portion of distribution 28 represents a concentration of mode energy at the defect center. Distribution 28 shows a large fraction of the mode energy confined to the defect. In contrast, the mode energy distribution 30 is characteristic of a surface mode, i.e., a mode that exists across the interface between the defect and the body of the photonic crystal. Mode energy distribution 30 shows that the energy is largely propagated outside the defect, and thus none of benefits with regard to low attenuation and minimization of non-linear effects are realized.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

We claim:

1. A photonic band-gap crystal optical waveguide comprising: a photonic band-gap crystal having a pitch and; a defect, including a core, said defect having a boundary that encloses a plane cross section and a length dimension perpendicular to the plane cross section, the defect boundary including a plurality of protrusions.

2. The photonic band-gap crystal optical waveguide of claim 1, wherein: said boundary is being characterized by a perpendicular distance from defect center to the nearest point on the boundary, said distance being such that: (i) that the wavelength of the localized mode produced by the defect propagates in the wavelength range of the photonic band-gap; and the ratio of the distance to the pitch is selected to avoid the excitation of surface modes within the photonic band-gap.

3. The photonic band-gap crystal optical waveguide of claim 2, wherein said distance is selected so that the mode power fraction confined to the core is not less than 0.6.

4. The photonic band-gap crystal optical waveguide of claim 1, wherein said band-gap crystal optical waveguide is an optical fiber, said plurality of protrusions being a plurality of ribs situated along the core surface; and said boundary is being characterized a numerical value, said numerical value being the distance from core center to the nearest point on one of said ribs.

5. The photonic band-gap crystal optical waveguide of claim 4, wherein, said core has refractive index lower than the refractive index of material immediately surrounding said core.

6. The photonic band-gap crystal optical waveguide of claim 1, wherein said waveguide is single mode waveguide, said defect having a circular cross section with the protruding ribs, said defect boundary is being characterized the distance from the center of said cross-section to the nearest point on said boundary, and, for a mode power fraction confined to core of not less than 0.6, the ratio of said distance to pitch has a range from about 0.6 to 2.5.

7. The photonic band-gap crystal optical waveguide of claim 6, wherein the mode power fraction confined to said core is not less than 0.75.

8. The photonic band-gap crystal optical waveguide of claim 1 wherein, said defect is a core having a hexagonal cross section plane, the mode power fraction confined to said core is not less than 0.6 and the defect boundary being characterized by a numerical value, wherein the numerical value is the length of a line drawn from the center of the hexagonal cross-section perpendicular to a side of the hexagon, and, the ratio of the numerical value to pitch has a range from 0.6 to 2.5.

9. The photonic band-gap crystal optical waveguide of claim 8, wherein the mode power fraction confined to said core is not less than 0.75.

10. The photonic band-gap crystal optical waveguide of claim 1, wherein said defect has a structure such that the mode power fraction confined to said core is not less than 0.6.

11. The photonic band-gap crystal optical waveguide of claim 1, wherein said boundary is selected such that the mode power fraction confined to said core is not less than 0.6.

12. The photonic band-gap crystal optical waveguide of claim 1, wherein: said boundary is being characterized by a numerical value and the numerical value is selected so that the wavelength of the localized mode produced by the defect propagates in the wavelength range of the photonic band-gap; and the ratio of the numerical value of said defect to the pitch is selected to avoid the excitation of surface modes within the photonic band-gap.

13. The photonic band-gap crystal optical waveguide of claim 1 wherein, said defect has a circular cross section plane with said plurality of ribs protruding from the defect boundary, said boundary is being characterized a numerical value and the numerical value is the radius of the circular cross section measured to the ribs.

14. The photonic band-gap crystal optical waveguide according to claim 1, wherein the number of said protrusions is 6 times where N is a positive integer.

15. A photonic crystal optical band-gap waveguide comprising: photonic band-gap crystal having a pitch; and a defect, including a core, said defect having a boundary that encloses a plane cross section and a length dimension perpendicular to the plane cross section, the defect boundary (i) including a plurality of protrusions and (ii) being characterized by at least one numerical value, wherein said numerical value is measured from defect center to the closest point on said boundary.

16. The photonic band-gap crystal optical waveguide of claim 15, wherein the mode power fraction confined to said core is not less than 0.6.

17. The photonic band-gap crystal optical waveguide of claim 15, wherein the number of said protrusions is 6×N, where N is a positive integer.

* * * * *